(12) United States Patent
Connor et al.

(10) Patent No.: US 11,787,527 B2
(45) Date of Patent: Oct. 17, 2023

(54) ACTUATION SYSTEM FOR COCKPIT CONTROL LEVERS

(71) Applicant: Lockheed Martin Corporation, Bethesda, MD (US)

(72) Inventors: Michael A Connor, New Haven, CT (US); Igor Cherepinsky, Sandy Hook, CT (US); Christopher J. Marini, Trumbull, CT (US); Nicholas Visinski, Stratford, CT (US); Ashley M. Currivan, Stratford, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 157 days.

(21) Appl. No.: 17/511,349

(22) Filed: Oct. 26, 2021

(65) Prior Publication Data

US 2023/0127623 A1    Apr. 27, 2023

(51) Int. Cl.
| | |
|---|---|
| *B64C 13/50* | (2006.01) |
| *B64C 13/04* | (2006.01) |
| *B64C 13/34* | (2006.01) |
| *F16D 28/00* | (2006.01) |
| *F16D 48/06* | (2006.01) |
| *F16D 27/00* | (2006.01) |

(52) U.S. Cl.
CPC .......... *B64C 13/50* (2013.01); *B64C 13/0421* (2018.01); *B64C 13/34* (2013.01); *F16D 27/00* (2013.01); *F16D 28/00* (2013.01); *F16D 48/06* (2013.01); *F16D 2500/1023* (2013.01)

(58) Field of Classification Search
CPC ..... B64C 13/50; B64C 13/0421; B64C 13/34; F16D 27/00; F16D 28/00; F16D 48/06; F16D 2500/1023
See application file for complete search history.

(56) References Cited

U.S. PATENT DOCUMENTS

| | | |
|---|---|---|
| 3,285,376 A | 11/1966 | Starrantino |
| 4,805,396 A | 2/1989 | Veerhusen et al. |
| 5,277,024 A | 1/1994 | Bissey et al. |
| 5,488,824 A | 2/1996 | Ledoux et al. |
| 8,052,096 B2 | 11/2011 | Cerchie et al. |
| 9,150,308 B2 | 10/2015 | Mercer et al. |

(Continued)

OTHER PUBLICATIONS

Extended European Search Report on European Patent Application No. 22195627.9 dated Mar. 20, 2023 (14 pages).

*Primary Examiner* — Rodney A Bonnette
(74) *Attorney, Agent, or Firm* — Foley & Lardner LLP

(57) ABSTRACT

An actuation system for an aircraft can include an actuator and a plurality of clutches connected to and structured to be moved by the actuator. The actuation system can include a plurality of control levers connected to the plurality of clutches and structured to be moved by the plurality of clutches when the plurality of clutches are moved by the actuator. The actuation system can include a processor connected to the actuator and to the plurality of clutches. The processor can identify one or more clutches connected to one or more control levers of the plurality of control levers for controlling an operation of the aircraft, and cause the one or more clutches connected to the one or more control levers to be in an engaged stat. The processor can activate the actuator to cause movement of the one or more control levers via the one or more clutches.

20 Claims, 7 Drawing Sheets

(56) References Cited

U.S. PATENT DOCUMENTS

| | | |
|---|---|---|
| 9,284,996 B2 | 3/2016 | Kruk et al. |
| 10,268,209 B2 | 4/2019 | Torralba |
| 2002/0091480 A1 | 7/2002 | Greene |
| 2011/0148666 A1* | 6/2011 | Hanlon ............... B64C 13/0421 340/407.1 |
| 2013/0211631 A1* | 8/2013 | Yates ................. B64C 13/0421 701/3 |
| 2017/0253320 A1 | 9/2017 | Baran et al. |
| 2019/0085774 A1* | 3/2019 | Thomassin ............. F02D 23/00 |
| 2019/0344885 A1 | 11/2019 | Defusco |
| 2020/0238807 A1* | 7/2020 | Yu ......................... B60K 17/02 |

* cited by examiner

ACTUATION SYSTEM FOR COCKPIT CONTROL LEVERS

TECHNICAL FIELD

The disclosure relates to an actuation system for controlling actuation of aircraft control levers and/or other aircraft controls, such as cockpit control levers. Specifically, the current disclosure relates to automatic control of control levers where any combination of levers can be automatically actuated.

BACKGROUND

Existing aircraft cockpits include several control levers that may be manipulated by a pilot in order to control and/or monitor operations of the aircraft. For instance, the pilot may use the control levers to control engine power, condition, mixture, brakes, flaps, ailerons, rudders, elevators, rotor blade pitch, and the like. Each control lever may interface with one or more corresponding aircraft system. In a conventional piloted aircraft, the pilot can control or monitor a given aircraft system by manipulating the corresponding control lever.

Optionally piloted vehicles (OPVs) are able to fly with or without a human crew on board the aircraft. OPVs can be employed in research, experimentation, and concept exploration operations as well as other types of operations. There is an increasing interest in OPVs as they can operate as conventional aircrafts or as unmanned aerial vehicles.

SUMMARY

According to at least one aspect, an actuation system for an aircraft can include an actuator and a plurality of clutches operatively connected to and structured to be moved by the actuator. The actuation system can include a plurality of control levers connected to the plurality of clutches and structured to be moved by the plurality of clutches when the plurality of clutches are moved by the actuator. The actuation system can include a processor operatively connected to the actuator and to the plurality of clutches. The processor can be configured to identify one or more clutches connected to one or more control levers of the plurality of control levers for controlling an operation of the aircraft, and cause the one or more clutches connected to the one or more control levers to be in an engaged stat. The processor can activate the actuator. The one or more clutches when moved by the actuator cause the one or more control levers to move.

In some implementations, the actuator can be mechanically connected to the plurality of clutches via a shaft. In some implementations, each clutch of the plurality of clutches can include a first component mechanically connected to the actuator and a second component mechanically connected to a corresponding control lever. The second component can be structured to engage the first component when the clutch is in the engaged state. In some implementations, the first and second components can include toothed plates that are structured to engage when plate teeth are enmeshed. In some implementations, the first component can be structured to engage the second component magnetically.

In some implementations, the actuation system can include a second actuator operatively connected to the processor. The second actuator can be structured to actuate movement of the plurality of clutches, or to actuate movement of a second plurality of clutches of the actuation system. The second plurality of actuators operatively connected to the plurality of control levers. In some implementations, the actuator can include at least one of a motor or a motor controller.

In some implementations, the actuation system can include one or more sensors operatively connected to the processor. The one or more sensors can be configured to detect a position of each control lever of the plurality of control levers, and provide feedback of the position of each control lever to the processor. In some implementations, the processor can be configured to identify the one or more clutches using one or more positions of the one or more control levers connected to the one or more clutches.

In some implementations, the processor can be configured to receive a command to control the operation of the aircraft, and to identify the one or more clutches based on the command. The command may include at least one of a mission command, a pilot input or a command triggered responsive to a flight condition. In some implementations, the processor can be configured to trigger the actuator to cause movement of the one or more clutches in the engaged state.

According to at least one other aspect, a method of actuating cockpit control levers can include a processor receiving a command to control an operation of the aircraft. The processor can be operatively connected to an actuator and to a plurality of clutches. The plurality of clutches can be operatively connected to the actuator and to a plurality of control levers. The method can include the processor identifying one or more clutches connected to one or more control levers of the plurality of control levers for controlling the operation of the aircraft. The method can include the processor causing the one or more clutches connected to the one or more control levers to be in an engaged state, and activating the actuator. The one or more clutches when moved by the actuator cause the one or more control levers to move.

In some implementations, each clutch of the plurality of clutches can include a first component mechanically connected to the actuator and a second component mechanically connected to a corresponding control lever. Causing the one or more clutches to be in the engaged state can include causing the second component to engage the first component. The method can include causing the second component to engage the first component via plate teeth. The method can include causing the second component to engage the first component magnetically.

In some implementations, the method can include causing a second actuator operatively connected to the processor to actuate movement of the plurality of clutches, or causing the second actuator to actuate movement of a second plurality of clutches of the actuation system. The second plurality of actuators can be operatively connected to the plurality of control levers. In some implementations, the method can include receiving, by the processor from one or more sensors operatively connected to the processor, indications of detected positions of the plurality of control levers. The method can include the processor determining a difference between a measured position of a control lever of the one or more control levers and a corresponding desired position, and deactivating the actuator upon determining that the measured position matches the corresponding desired position. In some implementations, the method can include identifying the one or more clutches based on the command. The command can include at least one of a mission command, a pilot input or a command triggered responsive to a flight condition.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

The following descriptions should not be considered limiting in any way. With reference to the accompanying drawings, like elements are numbered alike.

DETAILED DESCRIPTION

Below are detailed descriptions of various concepts related to, and implementations of, techniques, approaches, methods, apparatuses, and systems for automatically monitoring and controlling cockpit control levers. The various concepts introduced above and discussed in greater detail below may be implemented in any of numerous ways, as the described concepts are not limited to any particular manner of implementation. Examples of specific implementations and applications are provided primarily for illustrative purposes.

Figure 1:
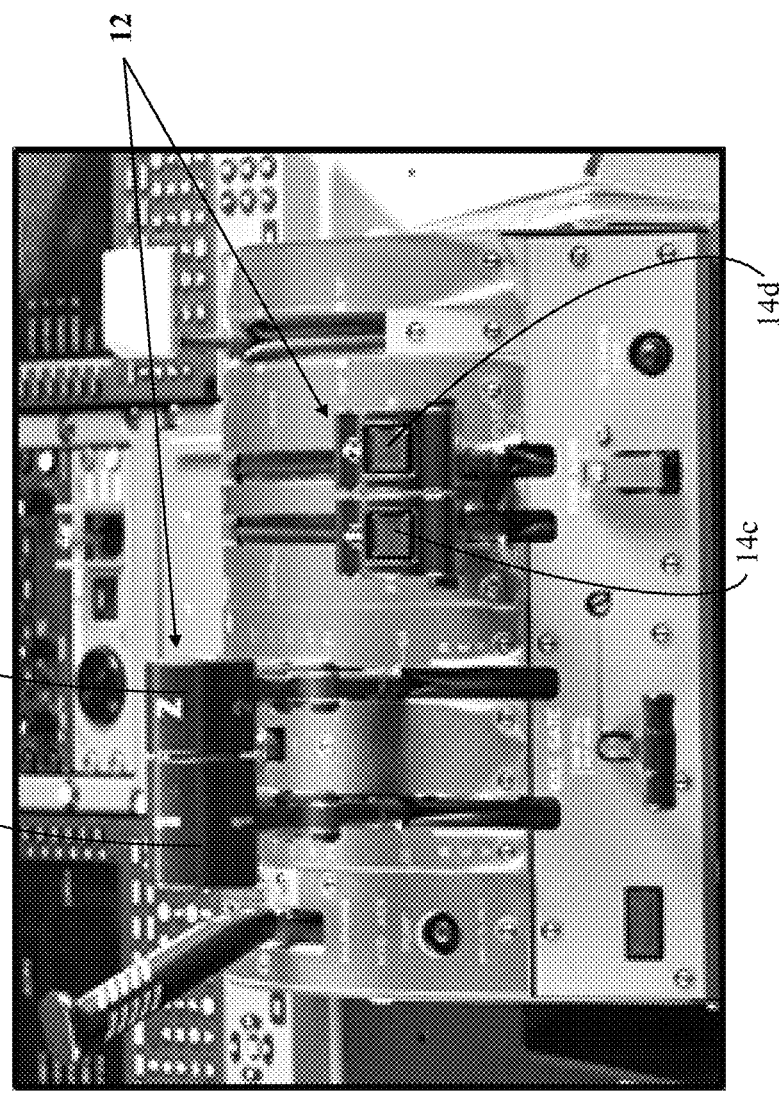
FIG. 1 depicts a control lever arrangement, in accordance with a conventional module.

Referring to FIG. 1, an example control panel 10 of an aircraft is shown. The aircraft can be a fixed-wing aircraft or other type of aircraft. The control panel 10 is arranged in the aircraft cockpit, usually adjacent to pilot seat. The control panel 10 includes an engine control lever arrangement 12 that is structured for single-hand movements. The engine control lever arrangement 12 includes four different control levers 14a-14d, referred to hereinafter, either individually or collectively, as control lever(s) 14. The control levers 14 are used to control engine power, condition, mixture, brakes and/or flaps, among other possible functions, operations or systems of the aircraft. In a conventional piloted aircraft, each of the control levers 114 is manually actuated to achieve the desired control over the corresponding aircraft system function or operation.

Modern fleets of aircraft cockpits are being converted to include autonomous features that often require highly invasive systems. For instance, in optionally piloted vehicles (OPVs), providing full automatic control in the OPV mode and/or workload reductions necessary for single pilot operation (SPO) call for automation of the operation of most or all control components including the control lever arrangement 12. The work involved in replacing legacy cockpits can make conversion and retro-fitting cost prohibitive, cumbersome and technically challenging. Conventional automation methods for aircraft cockpits may require invasive modification to the aircraft subsystem schematics, necessitating extensive functional and safety analysis of each change to the affected systems.

In particular, there are challenges in integrating automatic actuation into control levers because of the space constraints. The minimal installation volume available behind the control lever assemblies (e.g., behind or beneath the control levers 114) presents significant clearance and kinematic challenges for complex actuator installations. The space constraints call for novel mechanisms and systems for automatic control of control levers in aircrafts. In the current disclosure, systems, apparatuses and methods for addressing this technical problem are described.

Figure 2:
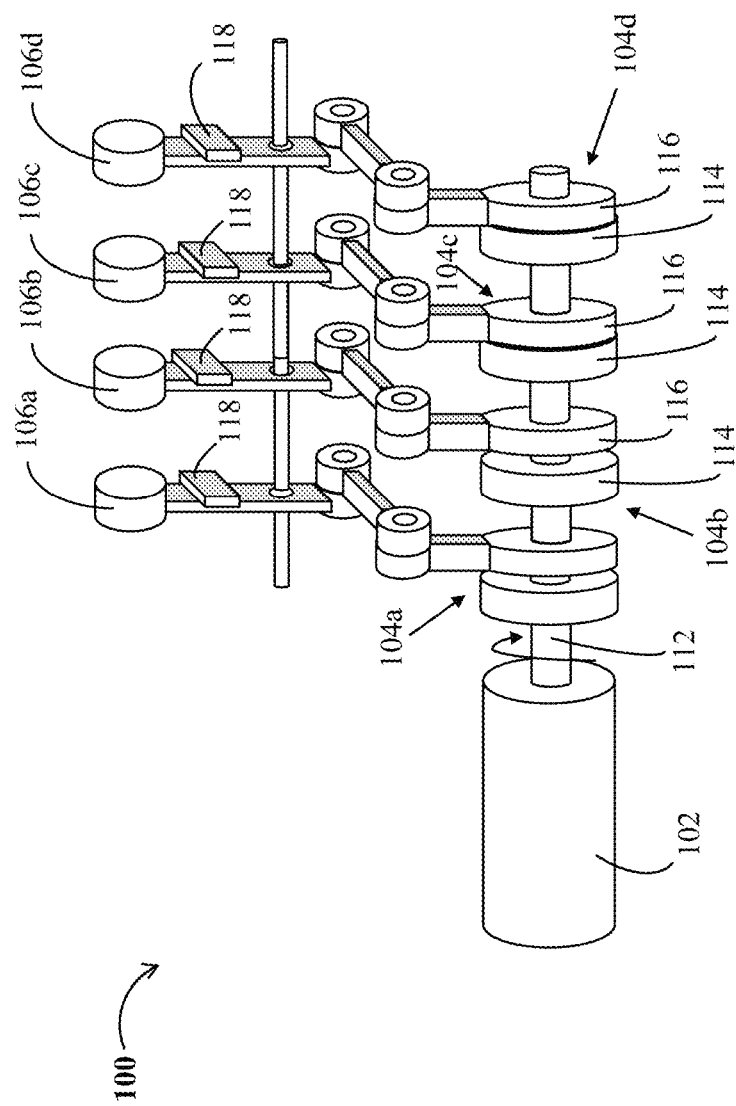
FIG. 2 depicts an elevation view of an actuation system for cockpit control levers, in accordance with example embodiments.
Figure 3:
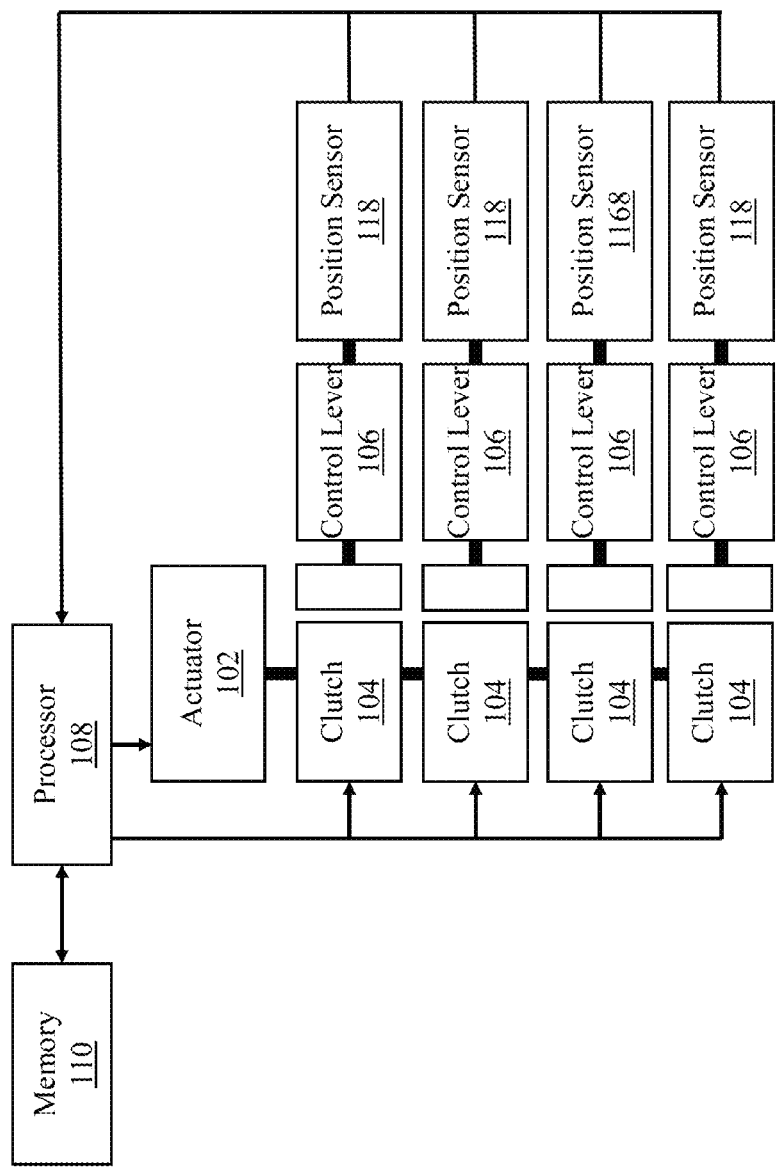
FIG. 3 depicts a block diagram of the actuation system shown in FIG. 2, in accordance with example embodiments.

Referring to FIGS. 2 and 3, an elevation view and a block diagram of an actuation system 100 for controlling cockpit control levers in an aircraft are shown, in accordance with example embodiments. The actuation system 100 can include an actuator 102 and a plurality of clutches 104a-104d, referred to hereinafter either individually or collectively as clutch(es) 104. The clutches 104 can be operatively connected to, and structured to be moved by, the actuator 102. The actuation system 100 can include a plurality of control levers 106a-106d referred to hereinafter, either individually or collectively, as control lever(s) 106. Each control lever 106 of the plurality of control levers 106 can be connected to a corresponding clutch 104 of the plurality of clutches 104 and structured to be moved by the corresponding clutch 104 when the corresponding clutch 104 is moved by the actuator 102. The actuation system 100 can include a processor 108 operatively connected to the actuator 102 and to the plurality of clutches 104, and configured to control actuation or movement of the clutches 104 or the control levers 106 operatively connected to the clutches 104. The actuation system 100 can include a memory 110 storing computer code instructions executable by the processor 108. The computer code instructions, when executed by the processor can cause the processor to perform operations described herein.

The actuator 102 can include a motor (e.g., electric motor or other type of motor) and/or a controller. The controller can include an electronic circuit for activating and/or deactivating the motor. The processor 108 can be communicatively connected to the controller, and can send instructions to the controller to activate or deactivate the motor. The actuator 102 or the motor, when activated, can output or generate rotational motion, translational motion or other type of motion. The motion generated by the motor or the actuator 102 can be used to move any number of clutches 104 and corresponding control levers 106.

The actuator 102 or the motor can be mechanically or kinematically connected to the plurality of clutches 104 via a shaft 112. The shaft 112 allows for transferring the motion generated by the actuator 102 or motor to all or a subset of the clutches 104. Specifically, each clutch 104 can have two different operational states; an engaged state and a disengaged state. In an engaged state, a clutch 104 is fully engaged (or fully connected kinematically and/or mechanically) with the shaft 112 so that the motion of the shaft 112 is transferred to the clutch 104 and to a corresponding control lever 106 connected to the clutch 104. For instance, an output rotational motion of the actuator 102 can cause the shaft 112 to rotate. The rotating shaft 112 can cause the engaged clutch(es) to rotate and therefore cause corresponding control lever(s) 106 to move. Each clutch 104 can be mechanically and/or kinematically connected to a corresponding control lever 106 of the plurality of control levers.

In a disengaged state, the clutch 104 is not fully connected kinematically (or mechanically) to the shaft 110 and the motion of the shaft 110 is not transferred to the control lever 106 connected to the clutch 104.

In some implementations, each clutch 104 of the plurality of clutches 104 can include a first component 114 that is mechanically and/or kinematically connected to the actuator 102 (e.g., permanently connected to the actuator 102 via the shaft 112) and a second component 116 mechanically and/or kinematically connected to the corresponding control lever 106. For instance, the first component 114 can be secured or fastened to the shaft 112 so that it automatically rotates with the shaft 112. The second component 116 can be loose or unsecured to the shaft 112. The second component 116 can be structured to engage the first component 114 when the respective clutch 104 is in the engaged state. As such, the second component 116 rotates with the shaft 112 only when the respective clutch 104 is in the engaged state. The first components 114 can be viewed as input components since the motion of the actuator 102 is first transferred to the first components 114. The second components 116 can be viewed as output components since they transfer motion to corresponding control levers 106 when the corresponding clutches are in the engaged state.

Figure 4:
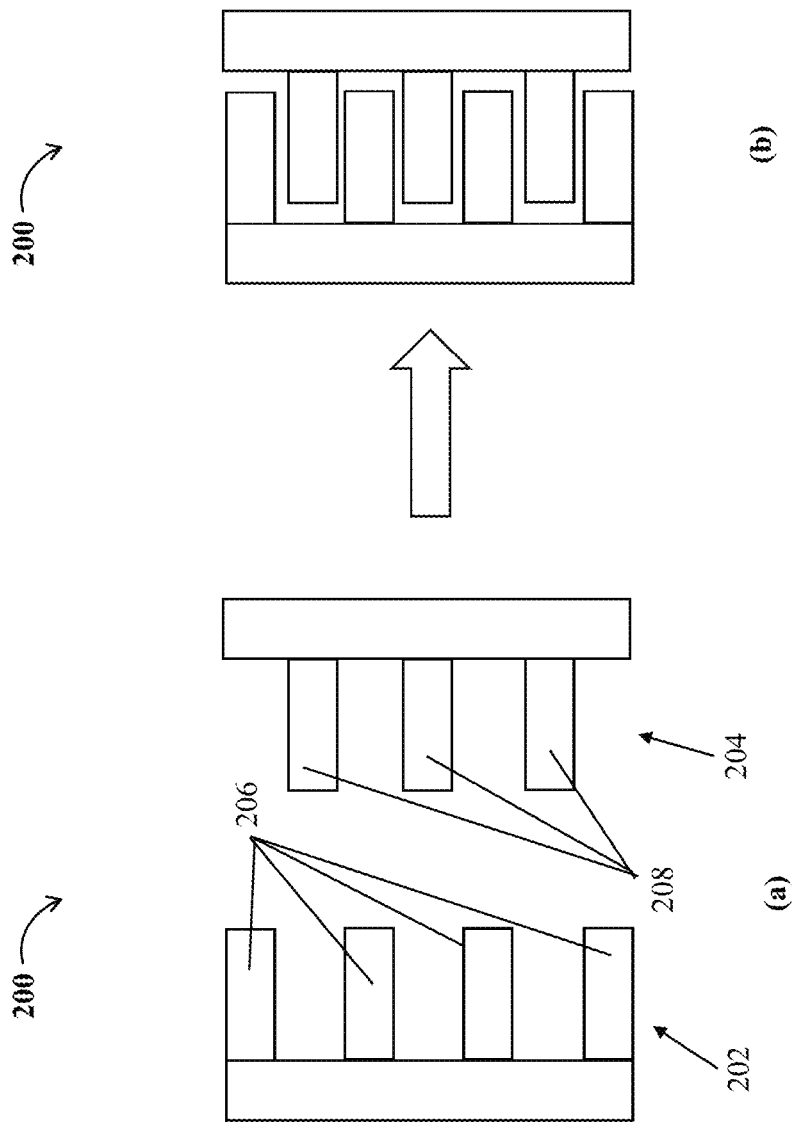
FIG. 4 shows an example clutch including toothed plates, in accordance with example embodiments.

Referring now to FIG. 4, an example clutch 200 including toothed plates is shown, according to example embodiments. The clutch 200 can include a first component 202 and a second component 204. The first and second components 202 and 204 can correspond to the first and second components 114 and 116 of FIG. 2, respectively. Alternatively, the first and second components 202 and 204 can correspond to the second and first components 116 and 114 of FIG. 2, respectively. The first component 202 can be structured to engage the corresponding second component 204 mechanically. Each of the components 202 and 204 can include or can be a toothed plate. The first component 202 can include a plurality of teeth 206, and the second component 204 can include a plurality of teeth 208. In FIG. 4, the figure (a) shows the clutch 200 in a disengaged state. In the disengaged state, the components 202 and 204 can be disjoined. The figure (b) of FIG. 4 shows the clutch 200 in an engaged state. The first and second components 202 and 204 can engage one another (and the clutch 200 is in the engaged state) when the plate teeth are enmeshed as depicted in FIG. 4 (b). When the clutch 200 is in the engaged state, the first clutch 202 causes the second component 204 to move (e.g., to rotate) with the first component 202. That is, the motion of the first component 202 generated by the actuator 102 and/or the shaft 112 is transferred to the second component 204.

While the components 202 and 204 of clutch 200 are structured as toothed plates that engage one another when the plate teeth are enmeshed, such structure is not limiting. Specifically, other structures are possible. For instance, the first component 114 (or the second component 116) can include a plurality of protrusions, while the second component 116 (or respectively the first component 114) can include a plurality of holes structured to host or engage the plurality of protrusions of the other component. The two components can engage one another when the protrusions of one component are aligned with and penetrating the holes of the other component.

Figure 5:
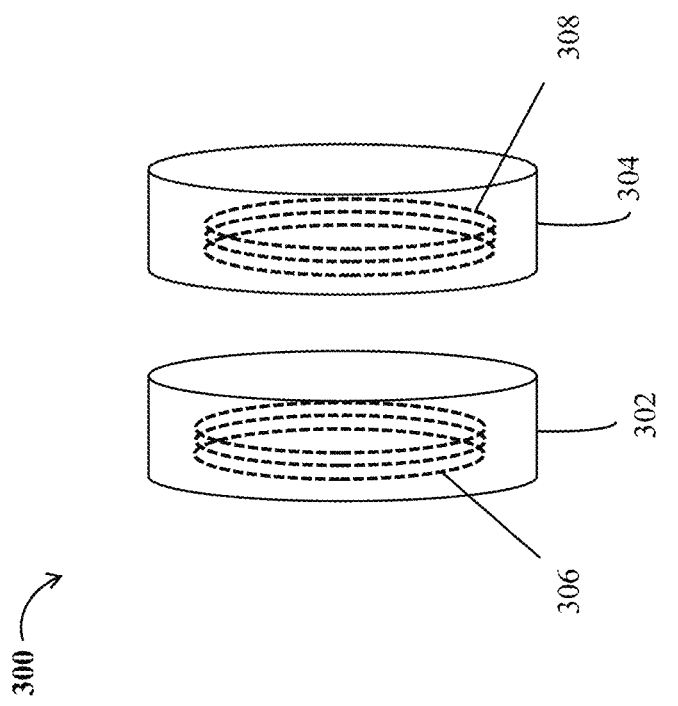
FIG. 5 shows another example clutch, in accordance with example embodiments.

Referring now to FIG. 5, another example clutch 300 is shown, according to example embodiments. The clutch 300 can include a first component 302 and a second component 304. The first and second components 302 and 304 can correspond to the first and second components 114 and 116 of FIG. 2, respectively. Alternatively, the first and second components 302 and 304 can correspond to the second and first components 116 and 114 of FIG. 2, respectively. The first and second components 302 and 304 can be structured to engage one another magnetically. The first component 302 can include a first coil 306 and the second component 304 can include a second coil 308. When the clutch 104 is in the engaged state, the first and second coils 306 and 308 can generate magnetic fields responsive to electric current running through the coils 306 and 308. When generated, the magnetic fields can generate an attraction force between the two components 302 and 304 causing both components 302 and 304 to rotate together.

Referring back to FIGS. 2 and 3, each control lever 106 can be mechanically and/or kinematically connected to a corresponding clutch 104. When the clutch 104 is in the engaged state, the clutch 104 moves (e.g., rotates) when the actuator 102 is activated and so does the corresponding control lever 106. In some implementations, each control lever 106 can have two or more different positions, and it may transition from one position to another when caused to move by the actuator 102 and the corresponding clutch 104. For instance, each clutch 104 can be moved back and forth between two or more positions.

The processor 108 can be operatively connected to the actuator 102 and/or the clutches 104. The processor 108 can be configured to control the actuator 102, the clutches 104 and/or the control levers 106. The processor 108 can execute computer code instructions, e.g., stored in the memory 110, to execute processes to control movement of the control levers 106 by controlling the actuator 102 and/or the clutches 106. The processor 108 can be operatively or communicatively connected to the sensors 118, and can receive sensor measurements from the sensors 118.

With regard to actuator 102, the processor 108 can be configured to trigger the actuator 102 each time any of the control levers 106 is to be moved. The processor 108 can receive commands or instructions to control the operation of the aircraft or to move one or more control levers 106. A received command or instruction can specify a function or operation of the aircraft to be controlled, such as controlling engine power, aircraft condition, mixture, brakes and/or flaps, among other possible functions, operations or systems of the aircraft. In some implementations, the command received by the processor 108 may specify the control lever 106 to be moved. The command may specify the desired or target position to which a given control lever 106 is to be moved. Commands received by the processor 108 can include at least one of a mission command, a pilot input or a command triggered (e.g., automatically triggered by a system of the aircraft) responsive to a flight condition.

The processor 108 can identify one or more control levers 106 and/or corresponding clutches 104 to be moved based on a received command. As discussed above, the received command can include an indication of the control lever(s) 106 and/or the corresponding clutch(es) 104. The received command may further include another indication of the desired position(s) of the control lever(s) 106. The processor 108 can identify the control lever(s) 106, the corresponding clutch(es) 104 and/or the desired position(s) or state(s) of the control lever(s) 106 based on the indication(s) in the received command.

The processor 108 may identify the control lever(s) 106, the corresponding clutch(es) 104 and/or the desired position(s) or state(s) of the control lever(s) 106 based on an indication of an operation or function of the aircraft. The indication of the operation or function can specify a desired state or desired feature(s) of the operation or function of the aircraft. For example, the indication can specify a desired level of the engine power, a desired aircraft condition, a desired mixture, a desired state or position of the brakes and/or a desired position of the flaps. The processor 108 can deduce one or more desired positions of one or more control levers 106 based the desired state or desired feature(s) of the operation or function of the aircraft specified in the received command. For instance, the processor 108 can use a look-up-table (LUT) or other data structure that maps various operations of functions of the craft and/or respective states or features to corresponding control levers 106 and/or respective positions. The LUT or the data structure can be stored or maintained by the memory 110 and can be accessed by the processor 108.

Once the control lever(s) 106 and/or the respective position(s) is determined, the processor 108 can determine the corresponding clutch(es) 104 and/or the corresponding position(s) of the clutch(es) 104. In some implementations, the LUT or the data structure can map various operations of functions of the craft and/or respective states or features to corresponding clutches 106 and/or respective positions, and the processor 108 may identify the clutch(es) 104 to be moved and/or the desired position(s) to which to be moved (to achieve the desired state or feature of the operation or function) based on the LUT or the data structure.

Upon identifying the clutch(es) 104 to be moved and the positions to which to move the clutch(es) 104, the processor 108 can activate or trigger the actuator 102. The processor 108 can send a signal to the controller of the actuator 102 to start the motor. The motor when started can transfer its output motion to the shaft 112. The processor 108 can trigger the identified clutch(es) 104 to switch from the disengaged state to the engaged state. The actuation system 100 can include one or more second controllers to control the clutches 104. In some implementations, the actuation system 100 can include a separate second controller for each clutch 104. The processor 108 can send a signal to one or more second controller to trigger the corresponding clutch(es) to switch from the disengaged state to the engaged state.

Referring back to FIG. 5, triggering the clutch(es) 104 can include the processor 108 and/or the second controller(s) triggering electric current to flow through the coils 306 of 308 (or causing electric current running through one of the coils 306 of 308 to be reversed) to generate an attraction force between the components 302 and 304. Referring back to FIG. 4, the processor 108 and/or the second controller(s) can trigger another motor (or another actuator) to cause the components 202 and 204 to engage one another.

Referring back to FIGS. 2 and 3, the sensors 118 can include position sensors structured to measure absolute position or relative position (e.g., displacement relative to a predefined reference or relative to a previous position). The sensors 118 can include an ultrasonic sensor, a proximity optical sensor, a string potentiometer, an Eddy current sensor, a laser Doppler vibrometer, a capacitive displacement sensor or a combination thereof, among others. The actuation system 100 can include a separate sensor 118 for each control lever 106. Each sensor 118 can be positioned on a corresponding control lever 106, and can be configured to measure the absolute or relative position of the corresponding control lever 106. The sensors 118 can be structured to measure positions of the corresponding control levers 106 regularly (e.g., periodically) or responsive to detected motion of the corresponding control levers 106.

The processor 108 can be communicatively connected to the processors 118, and can receive indications of measured positions from the sensors 118. In some implementations, upon identifying one or more control levers 106 to be moved, the processor 108 may query the corresponding sensors 118 for position measurements. In some implementations, the processor may query all sensors 118 on regular basis, or the sensors 118 may actively transmit position measurements to the processor 108 on a regular basis. The processor 108 can use position measurements received from the sensors 118 to determine whether or not cause a given control lever 106 to move and/or in which direction to move the control lever 106.

The processor 108 can determine whether lever adjustment is required by measuring the error or difference between a desired position and the current position of the control lever 106. The processor 108 can determine the current position for the control lever 106 based on measurements received from the sensor 118 associated with the control lever 106. If the data received from the sensor 118 represents relative position, the processor 108 may use information indicative of a previous absolute position of the control lever 106 (e.g., stored in the memory 110) and the position measurement(s) received from the sensor 118 to determine the current absolute position of the control lever 106.

When the processor 108 detects or determines that an individual lever movement is required, it will command the clutch 104 linked to the control lever 106 to engage and command the other clutches 106 to disengage. The processor 108 can also activate or trigger the actuator 102 to move, therefore, causing the clutch 104 in the engaged state and the corresponding control lever 106 to move. The processor 108 can keep receiving position measurements from the sensor 118 while the control lever 106 is moving, and calculating the difference or discrepancy between the desired position and the current (e.g., changing) position of the control lever 106 until the lever position determined based on sensor feedback matches the desired lever position. When the processor 108 determines that the current position of the control lever 106 is equal to or matches (e.g., within a predefined error tolerance range), the processor 108 can deactivate the actuator 102. The processor 108 may also command the clutch 104 linked (or operatively connected) to the control lever 106 that was moved to switch to the disengaged state.

In the event that several lever adjustments for multiple control levers 106 are to be made, the processor 108 may execute or trigger individual lever adjustments in a sequence. For instance, the processor 108 may adjust the position of a first control lever 106 until it matches a corresponding desired position, then adjust the position of a second control lever 106, and so on and so forth until all control levers 106 that are to be adjusted are in the corresponding desired positions. In some implementations, the processor 108 can determine whether any of the lever adjustments involve a correction or motion in the same direction. The processor 108 can trigger or effectuate adjustments involving correction or motion in the same direction simultaneously. The processor 108 can cause clutches 104 linked or operatively connected to control levers 106 that are to be moved in the same direction to be engaged (or in the engaged state) simultaneously, and then activate or trigger the actuator 102 in order to execute a combined lever adjustment. The combined lever adjustment can conclude once the lever position feedback from the sensors 118 indicates a match between the desired lever positions and the actual positions of the control levers 106. Applying combined lever adjustment leads to faster and more efficient (e.g., in terms of power consumption) adjustments.

Figure 6:
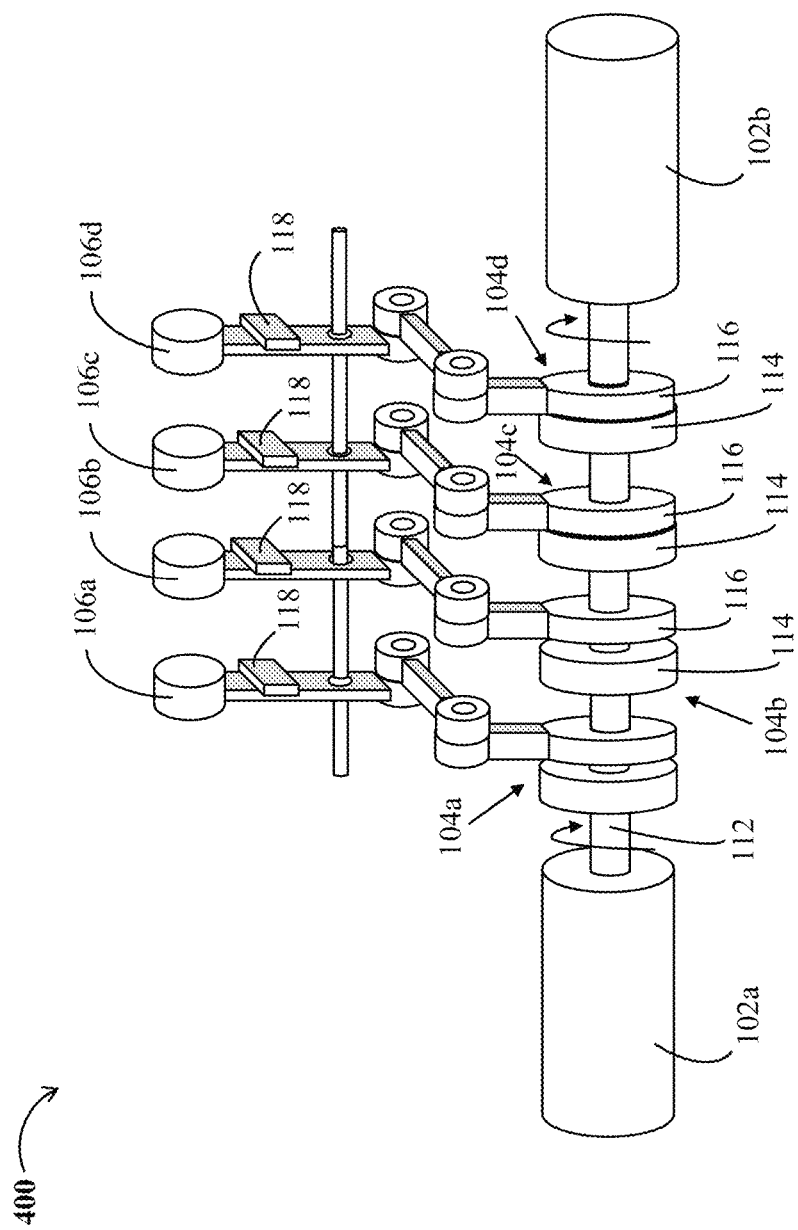
FIG. 6 shows an elevation view diagram of another example actuation system for controlling cockpit control levers in an aircraft, in accordance with example embodiments.

Referring now to FIG. 6, an elevation view diagram of another example actuation system 400 for controlling cockpit control levers in an aircraft is shown, in accordance with example embodiments. The actuation system 400 can be similar to the actuation system 100 shown in FIG. 3, except that the actuation system 400 includes two actuators 102a and 102b instead of a single actuator 102. In some implementations, and as shown in FIG. 5, both actuators 102a and 102b can be mechanically and/or kinematically connected to all the clutches 104. In other words, both actuators 102a and 102b can be structured to alternatively actuate the same clutches 104. In other words, the processor 108 can use either actuator 102a or actuator 102b to trigger motion position of clutches in the engaged state and achieve position adjustment for corresponding control levers 106. The use of multiple actuators provides redundancy, and the processor 108 can switch between the actuators 102a and 102b to drive the clutches and the control levers 106. For example, if one of the actuators is jammed or not working, the processor 108 can use the other actuator.

In FIG. 6, the clutches 104 are all operatively connected to the both the actuator 102a and the actuator 102b. In some implementations, the actuation system 400 can include a first set (or a first plurality) of clutches operatively connected to the first actuator 102a, and a second set (or a second plurality) of clutches 104 operatively connected to the second actuator 102b. The first actuator 102a can be structured to cause or actuate motion (or movement) of any combination of clutches of the first set of clutches, while the second actuator 102b can be structured to cause motion of any combination of clutches of the second set of clutches. Each control lever 106 can be operatively connected to a first clutch of the first set of clutches and a second clutch of the second set of clutches. As such, the processor 108 can cause position adjustment of a given control lever 106 using the first actuator 102a and a first clutch operatively connected to both the first actuator 102a and the control lever 106, or using the second actuator 102b and a second clutch operatively connected to both the second actuator 102b and the control lever 106.

Figure 7:
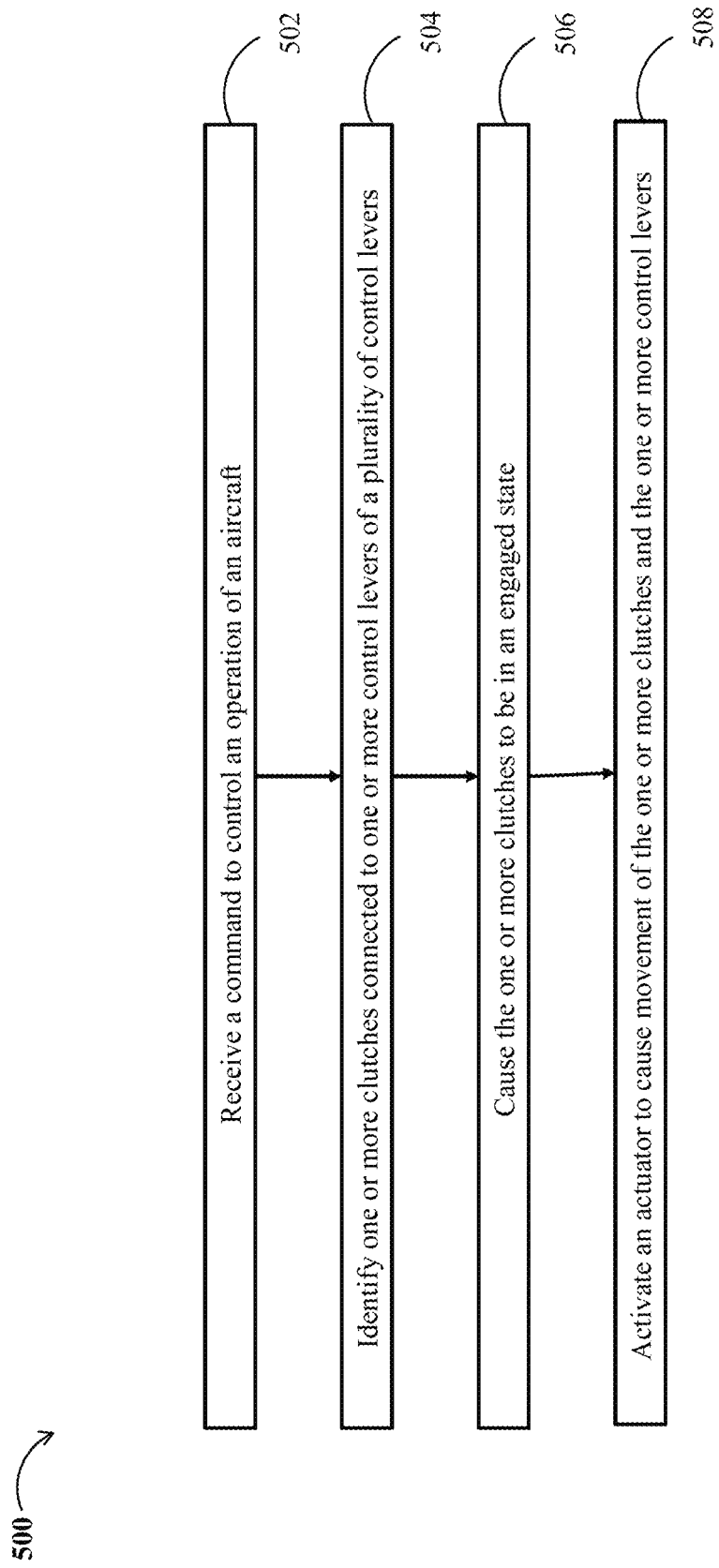
FIG. 7 depicts a flowchart illustrating a method of actuating cockpit control levers, in accordance with example embodiments.

Referring to FIG. 7, a flowchart illustrating a method 500 of actuating cockpit control levers is shown according to example embodiments. The method 500 can include receiving a command to control an operation of the aircraft (STEP 502). The method can include identifying one or more clutches connected to one or more control levers of a plurality of control levers (STEP 504). The method can include causing the one or more clutches connected to the one or more control levers to be in an engaged state (STEP 506), and activating the actuator (STEP 508). The one or more clutches when moved by the actuator cause the one or more control levers to move.

Referring to FIGS. 2-7, the method 500 can be executed by a processor, such as processor 108 as discussed above with regard to FIGS. 2-6. As discussed above, the processor 108 can be operatively connected to the actuator 102 and to the plurality of clutches 104. The plurality of clutches 104 can be operatively connected to the actuator 102 and to the plurality of control levers 106. The plurality of control levers 106 can be used for controlling the operation of the aircraft.

As discussed above, each clutch 104 of the plurality of clutches 104 can include a first component 114 mechanically connected to the actuator 102 and a second component 116 mechanically connected to a corresponding control lever 106. Causing the one or more clutches to be in the engaged state can include causing the second component 116 to engage the first component 114. The method 500 can include causing the second component 116 to engage the first component 114 via plate teeth as discussed above with regard to FIG. 4. The method 500 can include causing the second component 116 to engage the first component 114 magnetically as discussed above with regard to FIG. 5.

In some implementations, the method 500 can include causing a second actuator 102b operatively connected to the processor 108 to actuate movement of the plurality of clutches 104, or causing the second actuator 102b to actuate movement of a second plurality of clutches. The second plurality of actuators can be operatively connected to the plurality of control levers 106. In some implementations, the method 500 can include receiving, by the processor 108 from one or more sensors 118 operatively connected to the processor 108, indications of detected positions of the plurality of control levers 106.

The method 500 can include the processor 108 determining a difference between a measured position of a control lever 106 of the one or more control levers and a corresponding desired position, and deactivating the actuator 102 upon determining that the measured position matches the corresponding desired position. In some implementations, the method 500 can include identifying the one or more clutches based on the command. The command can include at least one of a mission command, a pilot input or a command triggered responsive to a flight condition. The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An actuation system for an aircraft comprising:
an actuator;
a plurality of clutches operatively connected to and structured to be moved by the actuator, the actuator mechanically connected to the plurality of clutches via a shaft;

a plurality of control levers connected to the plurality of clutches and structured to be moved by the plurality of clutches when the plurality of clutches are moved by the actuator; and one or more processors operatively connected to the actuator and to the plurality of clutches, the one or more processors configured to:
  determine a plurality of adjustments corresponding to the plurality of control levers, the plurality of adjustments comprising a motion in the same direction;
  identify a first set of the plurality of clutches, the first set comprising two or more clutches of the plurality of clutches connected to two or more control levers of the plurality of control levers for controlling an operation of the aircraft;
  cause the first set of the plurality of clutches connected to the two or more control levers to be in an engaged state; and
  activate the actuator, to cause the two or more control levers to move, via the shaft.

2. The actuation system of claim 1, further comprising:
a second actuator mechanically connected to and structured to move a second set of the plurality of clutches.

3. The actuation system of claim 2, wherein the actuator and second actuators are configured to adjust the first and second set of the plurality of clutches in opposite directions.

4. The actuation system of claim 1, wherein each clutch of the plurality of clutches includes a first component mechanically connected to the actuator and a second component mechanically connected to a corresponding control lever, the second component is structured to engage the first component when the clutch is in the engaged state, wherein the first component and the second component include toothed plates that are structured to engage when plate teeth of the toothed plates are enmeshed.

5. The actuation system of claim 1, wherein the plurality of control levers correspond to a plurality of aircraft functions, the functions comprising:
  mixture control;
  brake control; or
  flap control.

6. The actuation system of claim 1, further comprising a second actuator operatively connected to the one or more processors, the second actuator structured to:
  actuate movement of a second plurality of clutches of the actuation system, the second plurality of clutches operatively connected to the plurality of control levers.

7. The actuation system of claim 1, wherein the actuator includes at least one of:
  a motor; or
  a motor controller.

8. The actuation system of claim 1, further comprising one or more sensors operatively connected to the one or more processors, the one or more sensors configured to:
  detect a position of each control lever of the plurality of control levers; and
  provide feedback of a measured position of each control lever to the one or more processors.

9. The actuation system of claim 8, wherein the one or more processors are configured to:
  determine a difference between the measured position of a control lever and a corresponding desired position; and
  deactivate the actuator upon determining that the measured position matches the corresponding desired position.

10. The actuation system of claim 1, wherein the one or more processors are configured to:
  receive a command to control the operation of the aircraft; and
  identify the first set of the plurality of clutches based on the command.

11. The actuation system of claim 10, wherein the command includes at least one of:
  a mission command;
  a pilot input; or
  a command triggered responsive to a flight condition.

12. The actuation system of claim 1, wherein the one or more processors are further configured to trigger the actuator to cause movement of the first set of the plurality of clutches in the engaged state.

13. A method of actuating cockpit control levers, the method comprising:
  receiving, by one or more processors, a command to control an operation of an aircraft, the one or more processors operatively connected to an actuator and to a plurality of clutches, and the plurality of clutches operatively connected to the actuator, via a shaft, and to a plurality of control levers;
  determining a plurality of adjustments corresponding to the plurality of control levers, the plurality of adjustments comprising a motion in a first direction;
  identifying, by the one or more processors, a first set of the plurality of clutches, the first set comprising two or more clutches of the plurality of clutches connected to two or more control levers of the plurality of control levers for controlling the operation of the aircraft;
  causing, by the one or more processors, the first set of the plurality of clutches connected to the two or more control levers to be in an engaged state; and
  activating, by the one or more processors, the actuator, to cause the two or more control levers to move, via the shaft.

14. The method of claim 13, wherein each clutch of the plurality of clutches includes a first component comprising plate teeth mechanically connected to the actuator and a second component comprising plate teeth mechanically connected to a corresponding control lever, and wherein causing the two or more clutches to be in the engaged state includes causing the plate teeth of the second component to engage the plate teeth of the first component.

15. The method of claim 14, comprising:
  determining, by the one or more processors, a second plurality of adjustments corresponding to the plurality of control levers, the second plurality of adjustments comprising a motion in a second direction, opposite the first direction; and
  activating, by the one or more processors, a second actuator to cause a second set of clutches to move a second set of the plurality of clutches.

16. The method of claim 13, wherein the plurality of control levers correspond to a plurality of aircraft functions, the functions comprising:
  mixture control;
  brake control; or
  flap control.

17. The method of claim 13, further comprising:
  causing a second actuator to actuate movement of a second plurality of clutches, the second plurality of clutches operatively connected to the plurality of control levers.

18. The method of claim 13, further comprising:
receiving, from one or more sensors operatively connected to the one or more processors, indications of detected positions of the plurality of control levers;
determining a difference between a measured position of a control lever of the two or more control levers and a corresponding desired position; and
deactivating the actuator upon determining that the measured position matches the corresponding desired position.

19. The method of claim 13, comprising identifying the two or more clutches based on the command.

20. The method of claim 13, wherein the command includes at least one of:
a mission command;
a pilot input; or
a command triggered responsive to a flight condition.

* * * * *